(12) United States Patent
Wang et al.

(10) Patent No.: US 10,764,918 B2
(45) Date of Patent: Sep. 1, 2020

(54) WIRELESS COMMUNICATION FRAMEWORK FOR MULTIPLE USER EQUIPMENT

(71) Applicant: AT&T Intellectual Property I, L.P., Atlanta, GA (US)

(72) Inventors: Xiaoyi Wang, Austin, TX (US); Arunabha Ghosh, Austin, TX (US); Andrew Thornburg, Austin, TX (US); Thomas Novlan, Austin, TX (US); Ralf Bendlin, Cedar Park, TX (US); Milap Majmundar, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 79 days.

(21) Appl. No.: 16/004,811

(22) Filed: Jun. 11, 2018

(65) Prior Publication Data

US 2019/0380142 A1 Dec. 12, 2019

(51) Int. Cl.
*H04W 72/12* (2009.01)
*H04W 4/06* (2009.01)

(52) U.S. Cl.
CPC ......... *H04W 72/1289* (2013.01); *H04W 4/06* (2013.01)

(58) Field of Classification Search
None
See application file for complete search history.

(56) References Cited

U.S. PATENT DOCUMENTS

| 8,385,931 B2 | 2/2013 | Landstom et al. |
| 8,582,638 B2 | 11/2013 | Earnshaw et al. |
| 8,682,376 B2 | 3/2014 | Franceschini et al. |

(Continued)

FOREIGN PATENT DOCUMENTS

| CN | 107872888 A | 4/2018 |
| EP | 3282719 A1 | 2/2018 |

(Continued)

OTHER PUBLICATIONS

"Friedman, Larry ""SimpliciTI: simple modular RF network specification."" Update(2007): 1-03. 34 pages. http://vip.gatech.edu/wiki/images/a/ad/SimpliciTI+Specification.pdf".

(Continued)

*Primary Examiner* — Anh Ngoc M Nguyen
(74) *Attorney, Agent, or Firm* — Amin, Turocy & Watson, LLP

(57) ABSTRACT

The described technology is generally directed towards operating a user equipment node as a scheduler user equipment (e.g., which can be a local manager of other nodes in a group). The scheduler user equipment receives a scheduling request for the scheduling of the resources for transmission of data by a transmitter user equipment, and based on the traffic type requested, schedules the transmitter user equipment and receiver user equipment(s) with scheduling data/allocated radio resources. The transmitter user equipment can directly transmit to the receiver user equipment(s) on the allocated radio resources, e.g., without further involvement of the scheduler user equipment/local manager. For cellular data, the scheduler user equipment can schedule the transmitter user equipment to transmit to the scheduler user equipment as a receiver node.

20 Claims, 13 Drawing Sheets

(56) References Cited

U.S. PATENT DOCUMENTS

| | | | |
|---|---|---|---|
| 9,351,310 B2 | 5/2016 | Lagerqvist et al. | |
| 9,370,001 B2 | 6/2016 | Kim et al. | |
| 9,391,736 B2 | 7/2016 | Nayeb Nazar et al. | |
| 9,450,714 B2 | 9/2016 | Hwang et al. | |
| 9,756,653 B2 | 9/2017 | Kim et al. | |
| 9,768,942 B2 | 9/2017 | Golitschek Edler von Elbwart et al. | |
| 9,844,071 B2 | 12/2017 | Ostergaard et al. | |
| 10,111,246 B2 | 10/2018 | Zhang et al. | |
| 10,165,556 B2 | 12/2018 | Chu et al. | |
| 2011/0134827 A1 | 6/2011 | Hooli et al. | |
| 2012/0044890 A1 | 2/2012 | Jen | |
| 2012/0287844 A1 | 11/2012 | Ophir et al. | |
| 2013/0195026 A1 | 8/2013 | Johnsson et al. | |
| 2013/0208653 A1 | 8/2013 | Morioka et al. | |
| 2013/0322413 A1 | 12/2013 | Pelletier et al. | |
| 2014/0036704 A1 | 2/2014 | Han et al. | |
| 2014/0078971 A1 | 3/2014 | Bontu et al. | |
| 2014/0171062 A1 | 6/2014 | Fallgren et al. | |
| 2014/0177540 A1 | 6/2014 | Novak et al. | |
| 2014/0177586 A1 | 6/2014 | Jang et al. | |
| 2014/0256369 A1 | 9/2014 | Ji et al. | |
| 2015/0146633 A1 | 5/2015 | Kalhan | |
| 2015/0181587 A1 | 6/2015 | Yang et al. | |
| 2015/0271755 A1 | 9/2015 | Karri et al. | |
| 2016/0205714 A1* | 7/2016 | Morita | H04W 76/14 455/450 |
| 2016/0295565 A1 | 10/2016 | Kim et al. | |
| 2016/0345167 A1 | 11/2016 | Li et al. | |
| 2016/0374051 A1* | 12/2016 | Morita | H04W 72/02 |
| 2017/0006586 A1 | 1/2017 | Gulati et al. | |
| 2017/0013466 A1 | 1/2017 | Xu et al. | |
| 2017/0026997 A1 | 1/2017 | Moulsley | |
| 2017/0048905 A1 | 2/2017 | Yun et al. | |
| 2017/0064731 A1 | 3/2017 | Wang et al. | |
| 2017/0086028 A1 | 3/2017 | Hwang et al. | |
| 2017/0086114 A1 | 3/2017 | Jung et al. | |
| 2017/0134080 A1 | 5/2017 | Rahman et al. | |
| 2017/0135105 A1 | 5/2017 | Li et al. | |
| 2017/0201461 A1 | 7/2017 | Cheng et al. | |
| 2017/0208568 A1 | 7/2017 | Nam et al. | |
| 2017/0245245 A1 | 8/2017 | Kim et al. | |
| 2017/0273094 A1 | 9/2017 | Cheng et al. | |
| 2017/0280469 A1 | 9/2017 | Park et al. | |
| 2017/0289733 A1 | 10/2017 | Rajagopal et al. | |
| 2017/0295601 A1 | 10/2017 | Kim et al. | |
| 2017/0331670 A1 | 11/2017 | Parkvall et al. | |
| 2017/0339676 A1 | 11/2017 | Belghoul et al. | |
| 2017/0353971 A1 | 12/2017 | Gupta et al. | |
| 2017/0366311 A1 | 12/2017 | Iyer et al. | |
| 2018/0007606 A1 | 1/2018 | Lee et al. | |
| 2018/0035435 A1 | 2/2018 | Gupta et al. | |
| 2018/0041956 A1 | 2/2018 | Abraham et al. | |
| 2018/0042023 A1 | 2/2018 | Sheng | |
| 2018/0049084 A1 | 2/2018 | Lee et al. | |
| 2018/0049219 A1 | 2/2018 | Gupta et al. | |
| 2018/0049274 A1 | 2/2018 | Kim et al. | |
| 2018/0069928 A1 | 3/2018 | Martin et al. | |
| 2018/0070369 A1 | 3/2018 | Papasakellariou | |
| 2018/0076839 A1 | 3/2018 | Baghel et al. | |
| 2018/0092122 A1 | 3/2018 | Babaei et al. | |
| 2018/0124574 A1 | 5/2018 | Byun et al. | |
| 2018/0184270 A1 | 6/2018 | Chun et al. | |
| 2018/0192405 A1 | 7/2018 | Gong et al. | |
| 2018/0199317 A1 | 7/2018 | Hwang et al. | |
| 2018/0213554 A1 | 7/2018 | Zeng et al. | |
| 2018/0220398 A1 | 8/2018 | John et al. | |
| 2018/0220415 A1 | 8/2018 | Yin et al. | |
| 2018/0227942 A1 | 8/2018 | Hwang et al. | |
| 2018/0227949 A1 | 8/2018 | Tiirola et al. | |
| 2018/0234973 A1 | 8/2018 | Lee et al. | |
| 2018/0359773 A1 | 12/2018 | Tesanovic et al. | |
| 2019/0068996 A1 | 2/2019 | Ananthanarayanan et al. | |
| 2019/0246421 A1 | 8/2019 | Zhou et al. | |
| 2020/0022089 A1 | 1/2020 | Guo | |
| 2020/0029318 A1 | 1/2020 | Guo | |
| 2020/0092685 A1 | 3/2020 | Fehrenbach et al. | |
| 2020/0106566 A1 | 4/2020 | Yeo et al. | |

FOREIGN PATENT DOCUMENTS

| | | |
|---|---|---|
| KR | 20180039472 A | 4/2018 |
| WO | 2016106713 A1 | 7/2016 |
| WO | 2017007104 A1 | 1/2017 |
| WO | 2017126266 A1 | 7/2017 |
| WO | 2017133646 A1 | 8/2017 |
| WO | 2017/162040 A1 | 9/2017 |
| WO | 2017164141 A1 | 9/2017 |
| WO | 2017/173133 A1 | 10/2017 |
| WO | 017173133 A1 | 10/2017 |
| WO | 2017171528 A1 | 10/2017 |
| WO | 2017171909 A1 | 10/2017 |
| WO | 2017176097 A1 | 10/2017 |
| WO | 2017196215 A1 | 11/2017 |
| WO | 2018031623 A1 | 2/2018 |
| WO | 2018/059701 A1 | 4/2018 |
| WO | 2018/062948 A1 | 4/2018 |
| WO | 2018/064179 A1 | 4/2018 |
| WO | 2018062454 A1 | 4/2018 |
| WO | 2018067400 A1 | 4/2018 |
| WO | 2018/080568 A1 | 5/2018 |
| WO | 2018/084520 A1 | 5/2018 |
| WO | 2018080629 A1 | 5/2018 |
| WO | 2018084590 A1 | 5/2018 |
| WO | 2018/113947 A1 | 6/2018 |
| WO | 2018112322 A2 | 6/2018 |
| WO | 2018/145067 A1 | 8/2018 |
| WO | 2018/147996 A1 | 8/2018 |
| WO | 2018139892 A1 | 8/2018 |
| WO | 2018144899 A1 | 8/2018 |
| WO | 2019177783 A1 | 9/2019 |

OTHER PUBLICATIONS

"Ruckebusch, Peter, et al. ""WiSHFUL: Enabling Coordination Solutions forManaging Heterogeneous Wireless Networks."" IEEE Communications Magazine55.9 (2017): 118-125. 9 pages. https://biblio.ugent.be/publication/8541159/file/8541162.pdf".

"Zervas, Georgios, et al. """"Service-oriented multigranular optical networkarchitecture for clouds."" IEEE/OSA Journal of Optical Communications andNetworking 2.10 (2010): 883-891. 9 pages. http://repository.essex.ac.uk/3757/1/05594024.pdf".

"Sykora, J., et al. ""Cooperative strategies and networks."" Cooperative radiocommunications for green smart environments. Gistrup: River Publishers (2016). 34 pages. https://pdfs.semanticscholar.org/912f/4ab9c15ce35c16e9569c5680ff471fd0cb1c.pdf".

"Madueno, German Corrales, et al. ""Deliverable D2. 5 Report on 5G evolution (third revision)."" Project: H2020-ICT-688712, Ver. 1.0, Mar. 2018. 83 pages. https://www.triangle-project.eu/wp-content/uploads/2018/04/TRIANGLE_Deliverable_D2-5.pdf".

Apostolaras et al., "Evolved User Equipment for Collaborative Wireless Backhauling in Next Generation Cellular Networks", URL: http://nitlab.inf.uth.gr/NITlab/papers/[Apostolaras [SECON15] [Evolved%20UEs].pdf, 12th Annual IEEE International Conference on Sensing, Communication, and Networking (SECON), IEEE, 2015, 9 pages.

Tullberg et al., "METIS System Concept: The Shape of 5G to Come", URL: https://pdfs.semanticscholar.org /f0cb/be302eed502ff98acdf557649ce23c21c111.pdf, IEEE Communications Magazine, 2015, 13 pages.

Non-Final Office Action received for U.S. Appl. No. 15/923,958 dated Apr. 15, 2019, 39 pages.

International Search Report and Written Opinion for International Application Serial No. PCT/US2019/020150 dated Jun. 5, 2019, 17 pages.

5G Americas, "V2X Cellular Solutions," http://www.5gamericas.org/files/2914/7769/1296/5GA_V2X_Report_FINAL_for_upload.pdf, Last Accessed: May 23, 2018, 37 pages.

(56) References Cited

OTHER PUBLICATIONS

Final Office Action received for U.S. Appl. No. 15/923,958 dated Sep. 6, 2019, 49 pages.

Non-Final Office Action received for U.S. Appl. No. 15/923,958 dated Feb. 26, 2020, 40 pages.

International Search Report and Written Opinion received for International Application Serial No. PCT/US2020/012269 dated Apr. 17, 2020, 18 pages.

AT&T: "Resource allocation mechanism", 3GPP Draft; R1-1812872 Resource Allocation Mechanism, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018-Nov.. 16, 2018, Nov. 11, 2018 (Nov. 11, 2018), XP051554834, Retrieved from the Internet: URL:http://www.3gpp.org/ftp/Meetings%5F3GPP%5FSYNC/RAN1/Docs/R12D1812872%2Ezip [retrieved on Nov. 11, 2018] sections 1-6.

"AT&T: ""Sidelink based synchronization mechanism""", 3GPP Draft; R1-1809068 Sidelink Based Synchronization Mechanism, 3rd Generation Partnership Project (3GPP), Mobile Competence Centre; 650, Route Des Lucioles; F-06921 Sophia-Antipolis Cedex; France, vol. RAN WGI, No. Gothenburg, Sweden; Aug. 20, 2018-Aug. 24, 2018, Aug. 11, 2018 (Aug. 11, 2018), XP051516438, Retrieved from the Internet:URL:http://www.3gpp.org/ftp/tsg%5Fran/WG1%5FRL1/TSGR1%5F94/Docs/R1%2D1809068%2Ezip, [retrieved on Aug. 11, 2018] sections 1-6."

Final Office Action received for U.S. Appl. No. 15/923,958 dated Jun. 25, 2020, 48 pages.

Non-Final Office Action received for U.S. Appl. No. 16/366,347 dated Jun. 8, 2020, 63 pages.

Non-Final Office Action received for U.S. Appl. No. 16/366,254 dated Jul. 21, 2020, 50 pages.

* cited by examiner

WIRELESS COMMUNICATION FRAMEWORK FOR MULTIPLE USER EQUIPMENT

TECHNICAL FIELD

The subject application is related to wireless communication systems, and, for example, to a wireless communication framework for multiple user equipment in vehicle-to-everything (V2X) communications.

BACKGROUND

In LTE wireless communication systems, vehicle-to-everything (V2X) generally utilizes the Sidelink interface, alternatively referred to as PC5, to enable V2X communications, including V2V (vehicle-to-vehicle) communications, V21 (vehicle-to-infrastructure) communications, V2P (vehicle-to-pedestrian) communications and V2N (vehicle-to-network) communications. The PC5 interface is built based on a mesh architecture of peer-to-peer device communication. LTE V2X also supports Uu interface (the radio interface between the mobile device and the radio access network) enhancement to assist the PC5 communications.

Existing (e.g., PC5-based) interfaces assume a mesh architecture in which every node is a peer to each other. This approach does not rely on any network infrastructure. However, spectrum efficiency cannot be very high because of the peer-to-peer structure. Another drawback of this mesh architecture is that it is not compatible with infrastructure-based cellular networks that utilize a hierarchical architecture. As a result, a separate spectrum needs to be obtained to deploy a V2X service based on a peer-to-peer mesh network architecture, which is very costly.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
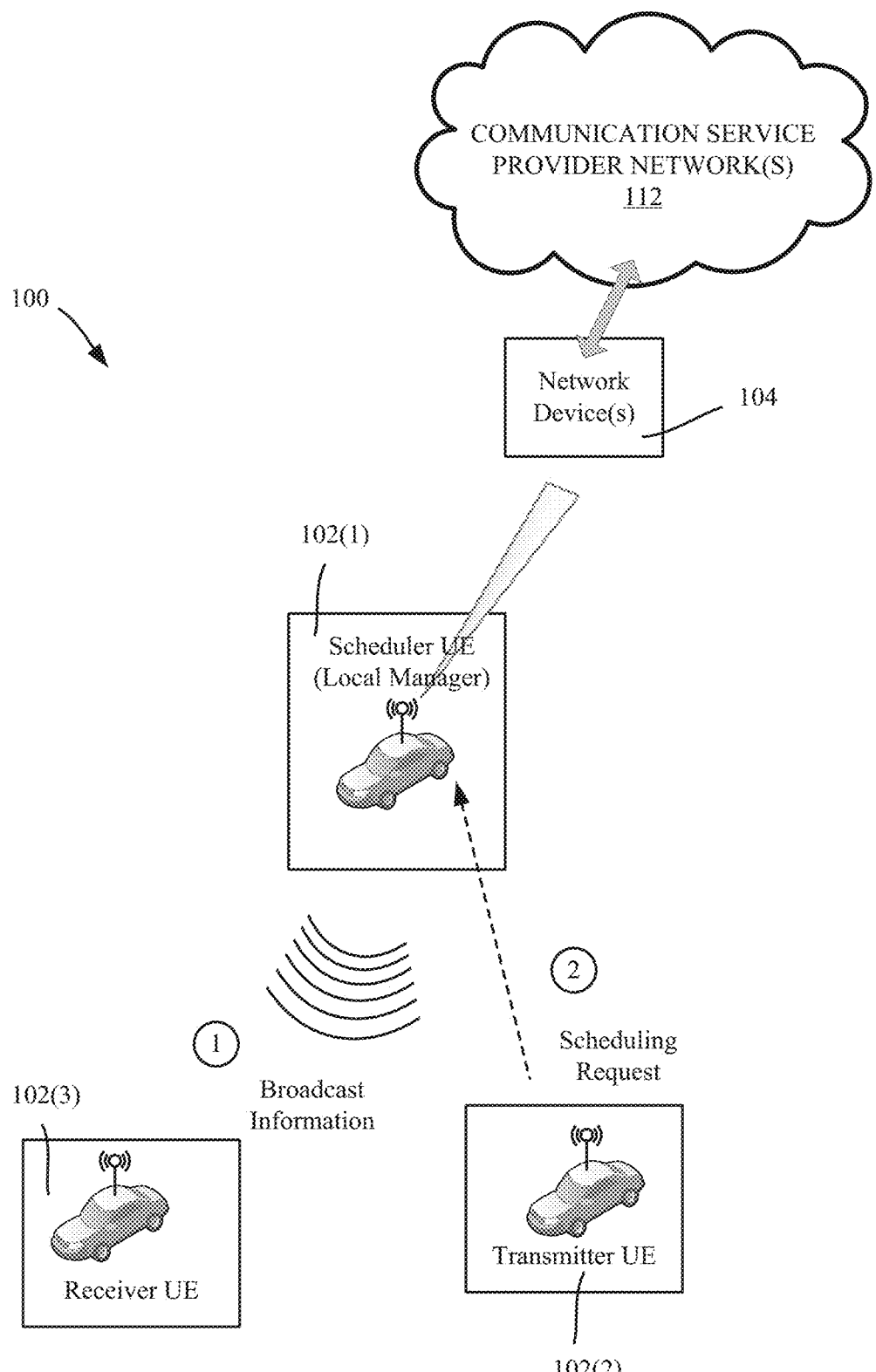
FIG. 1 illustrates an example wireless communication system in which one node (a scheduler user equipment) broadcasts its scheduling ability and schedules another node (a transmitter user equipment) for transmission to receiver node(s), in accordance with various aspects and implementations of the subject disclosure.

Briefly, one or more aspects of the technology described herein are generally directed towards multiple party (e.g., three party) communication. As will be understood, a third node, (other than the transmitter user equipment and receiver user equipment), referred to herein as a scheduler user equipment, acts as a local resource coordinator for a group of user equipment nodes with respect to coordinating their radio resource usage. More particularly, while the scheduling/resource allocation can be performed by a local resource coordinator/local manager node (the scheduler user equipment), the data transmission can be done by different user equipment nodes in a distributed manner, which can be a direct data transmission between a transmitter and one or more receivers. As used herein, "direct" data transmission means that no intervening node (including the scheduler user equipment, network device and so on) necessarily needs to be involved; however, as described herein the radio resources are scheduled, and thereby avoid or significantly reduce the chances of interference that often occurs with indiscriminate mesh device/peer-to-peer communications.

In one or more implementations, the third/centralized local manager node is thus referred to herein as a scheduler user equipment, while the other nodes (in a three party example) are referred to as a transmitter user equipment and a receiver user equipment. The scheduler user equipment broadcasts synchronization signals (Synchronization Signal Bloc, or SSB, and Tracking Reference Signal, or TRS) to surrounding user equipments. The broadcasting information includes the resource pool information.

Other nodes synchronize with the scheduler user equipment and receive the broadcast information.

When a transmitter user equipment has some V2X (vehicle-to-everything) traffic data packet(s), the transmitter user equipment sends a scheduling request to the scheduler user equipment. In one or more implementations, the scheduling request includes the traffic type, which can comprise V2X broadcast or multi-cast traffic, cellular traffic or V2X unicast traffic (which additionally identifies the designated receiver user equipment for the targeted unicast traffic).

Upon receiving the scheduling request, the scheduler user equipment starts to schedule radio resources. In one or more implementations, the scheduling decision is transmitted as DCI (Downlink Control Information) from the scheduler user equipment to the transmitter user equipment and the receiver user equipment(s). The DCI may include the resource allocation, MCS, precoder, and so forth.

Upon receiving DCI, the transmitter user equipment is to transmit data on the allocated radio resource while receiver user equipment(s) is intended to receive data on the allocated radio resources. For unicast V2X traffic, the designated receiver user equipment is picked according to the receiver identified in the scheduling request. For broadcast V2X traffic, the receive DCI is broadcast to all surrounding user equipments, while for multi-cast traffic, the receive DCI is transmitted to a group of user equipments.

By way of example, consider that a user equipment wants to broadcast some local traffic-related information to one or more other user equipments. The user equipment does not need this information to go to the core network, just to locally neighboring user equipments. The user equipment thus becomes a transmitter user equipment, and requests data transmission resources for a broadcast communication, from the scheduler user equipment with which the transmitter user equipment has synchronized. The scheduler user equipment coordinates this request with any other scheduled transmission resources it has allocated, and allocates the resources by sending scheduling data to the transmitter user equipment and also schedulers the receiver user equipment(s). The transmitter user equipment then broadcasts the traffic-related data to the receiver user equipment(s) based on the scheduling data.

For cellular data, the scheduler user equipment is also the receiver node. In one alternative, if the scheduler user equipment has IAB (Integrated Access and Backhaul) or mobile relay functionality, then the communication between the transmitter user equipment and the scheduler user equipment becomes an access link (e.g., as used by conventional cellular user equipments) and the data is relayed over a backhaul link to another IAB node or donor node (e.g., a node with wired cellular core network connectivity). In another alternative the link between the scheduler user equipment and the transmitter user equipment utilizes Sidelink control formats and data transmission formats.

It should be understood that any of the examples and terms used herein are non-limiting. For instance, the examples are based on New Radio (NR, sometimes referred to as 5G) communications between a user equipment exemplified as a vehicle device, a smartphone or the like and a network device; however virtually any communications devices may benefit from the technology described herein, and/or their use in different spectrums may likewise benefit. Notwithstanding, these are non-limiting examples, and any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled).

As is known, instead of having a peer-to-peer mesh network, recent wireless radio technology provides the ability promote a UE (which can be a special type of UE such as a Vehicle or Road-side Unit) to act as local manager for a group of neighboring UEs. A local manager can act a relay node. The local manager can provide access to UEs, and can schedule UEs over a Sidelink interface with radio resources from a resource pool granted by the network, while maintaining a hierarchical network architecture which can be used in conjunction with infrastructure-based IAB deployments. Note that it is also known that a local manager can be elected by other neighboring UEs without network involvement. In one aspect, such a local manager can operate as a scheduling user equipment as described herein.

FIG. 1 illustrates an example wireless communication system 100 in accordance with various aspects and embodiments of the subject technology. In one or more embodiments, the system 100 can comprise one or more user equipments; three such user equipments 102(1)-102(3) are exemplified in FIG. 1.

The user equipment 102(1) is the scheduler user equipment, which can be operating as a local manager, or acting on behalf of a local manager. In the example shown, the scheduler user equipment 102(1) couples to the network 104 (e.g., any network device or devices). The scheduler user equipment 102(1) communicates with the network 104, and in turn to one or more communication service provider networks 112. In various embodiments, the system 100 is or comprises a wireless communication network serviced by one or more wireless communication network providers. In example embodiments, a user equipment (collectively or individually 102) can be communicatively coupled to the wireless communication network via a network device 104 (e.g., network node). The network device 104 can communicate with a user equipment (UE) 102, thus providing connectivity between the user equipment and the wider cellular network.

In example implementations, each user equipment 102 such as the user equipment 102(1) is able to send and/or receive communication data via a wireless link to the network device 104. The system 100 can thus include one or more communication service provider networks 112 that facilitate providing wireless communication services to various user equipment, including user equipments 102(1)-102(3), via the network device 104 and/or various additional network devices (not shown) included in the one or more communication service provider networks 112. The one or more communication service provider networks 112 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 112 can be or include the wireless communication network and/or various additional devices and components of the wireless communication network (e.g., additional network devices and cell, additional user equipments, network server devices, etc.).

The network device 104 can be connected to the one or more communication service provider networks 112 via one or more backhaul links or the like. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., a user equipment 102 and the network device 104). While example embodiments might be described for 5G new radio (NR) systems, the embodiments can be applicable to any radio access technology (RAT) or multi-RAT system where the user equipment operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the user equipments 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Turning to aspects related to the use of a scheduling user equipment 102(1), in one or more implementations, the other nodes (in the three party example of FIG. 1) are the transmitter user equipment 102(2) and the receiver user equipment 102(3). As represented in FIG. 1 by "broadcast information" (labeled with circled numeral one (1)), the scheduler user equipment 102(1) broadcasts synchronization signals to surrounding user equipments, which in this example include the transmitter user equipment 102(2) and the receiver user equipment 102(3). The broadcasting information includes the resource pool information. Other nodes, including the transmitter user equipment 102(2) and the receiver user equipment 102(3), synchronize with the scheduler user equipment 102(1) and receive the broadcast information.

When the transmitter user equipment 102(2) has some V2X (vehicle-to-everything) traffic data packet(s), the transmitter user equipment 102(2) sends a scheduling request to the scheduler user equipment 102(1), as represented in FIG. 1 via the dashed arrow labeled with circled numeral two (2). The scheduling request includes the traffic type, which can comprise V2X broadcast or multi-cast traffic, cellular traffic or V2X unicast traffic (which additionally identifies the designated receiver user equipment for the targeted unicast traffic).

Upon receiving the scheduling request, the scheduler user equipment 102(1) starts to schedule radio resources. In general, the scheduler user equipment 102(1) allocates radio resources so as to avoid interference between transmitters, in generally the same way a network node allocates radio resources.

Figure 2:
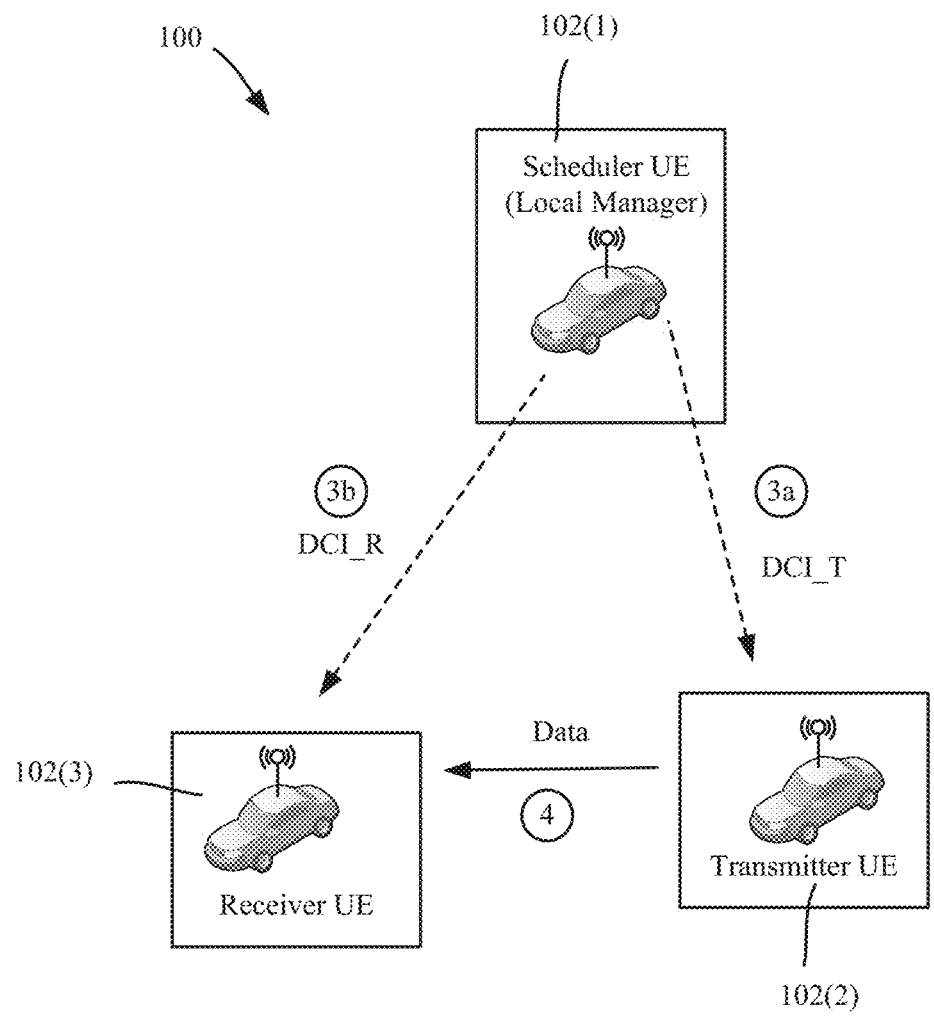
FIG. 2 illustrates an example wireless communication system in which a scheduler user equipment schedules a transmitter user equipment and a receiver user equipment for a direct unicast transmission, in accordance with various aspects and implementations of the subject disclosure.

Further general operations are represented in FIG. 2. In one or more implementations, the scheduling decision (scheduling data) is transmitted as DCI (Downlink Control Information) from the scheduler user equipment 102(1) to the transmitter user equipment 102(2) and the receiver user equipment(s), which in the example of FIG. 1 is the receiver user equipment 102(3). The DCI communication to the transmitter user equipment 102(2) is represented in FIG. 2 via the dashed arrow labeled with circled numeral 3*a* (DCI_T), while the DCI communication to the receiver user equipment 102(3) is represented in FIG. 2 via the dashed arrow labeled with circled numeral 3*b* (DCI_R). The DCI may include the resource allocation, modulation and coding scheme (MCS) information, precoder information, and so forth.

Upon receiving the DCI, the transmitter user equipment 102(2) is to transmit data on the allocated radio resources (e.g., time slot, frequency and so forth) while the receiver user equipment 102(3) is to receive data on the allocated radio resources. For unicast V2X traffic, the designated receiver user equipment 102(3) is picked according to the scheduling request, in which the transmitter user equipment 102(2) identified the receiver user equipment 102(3). Unicast traffic is represented in FIG. 2, by the "Data" arrow labeled with circled numeral four (4). Note that the data transmission from the transmitter user equipment 102(2) to the receiver user equipment 102(3) is "direct" in that the data transmission is not routed or in any way needs to further involve the scheduler user equipment 102(1).

Figure 3:
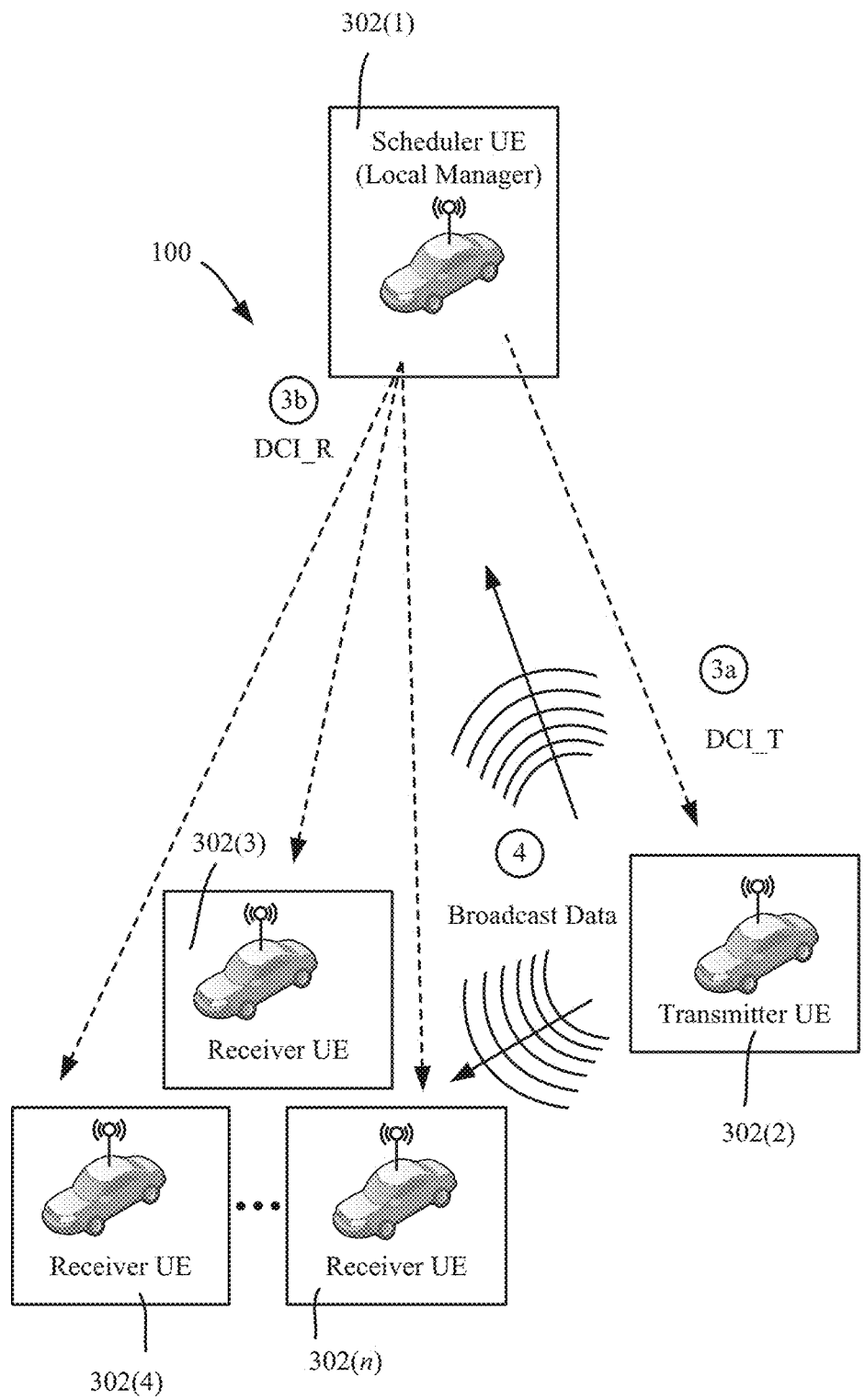
FIG. 3 illustrates an example wireless communication system in which a scheduler user equipment schedules a transmitter user equipment and receiver user equipments for a broadcast (or multicast) transmission, in accordance with various aspects and implementations of the subject disclosure.

FIG. 3 shows an implementation in which broadcast (or multicast) V2X traffic is transmitted. As generally described with reference to FIG. 1, in FIG. 3 a transmitter user equipment 302(2) has obtained transmit scheduling data (via DCI) from a scheduler user equipment 302(1), (the dashed arrow labeled 3*a*), and the receive DCI is broadcast to the surrounding user equipments 302(3)-**302(*n*)** (the dashed arrows labeled 3*ba*). Based on the scheduling data, the transmitter user equipment 302(2) transmits (broadcasts) data (the arrows labeled four (4) to all surrounding receiver user equipments 302(3)-**302(*n*), (as well as the scheduling user equipment 302(1), acting as a receiver for the broadcast traffic. Note that FIG. 3** generally applies to multicast traffic as well, although as is understood the receive DCI is transmitted to an appropriate group (e.g., a proper subset, but possible the full set) of user equipment(s).

Figure 4:
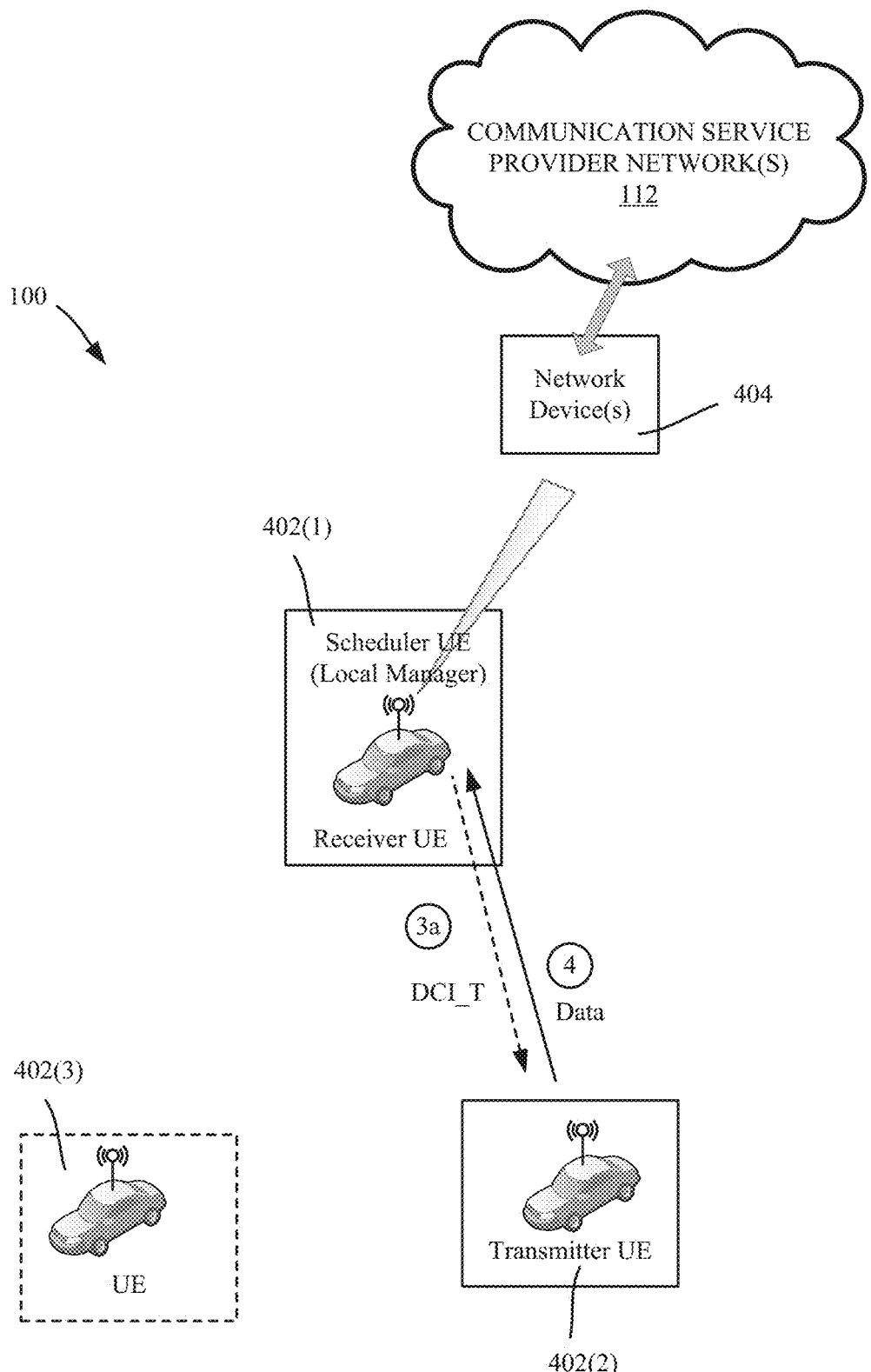
FIG. 4 illustrates an example wireless communication system in which a scheduler user equipment schedules a transmitter user equipment to transmit cellular data to the scheduler user equipment (as a receiver node), in accordance with various aspects and implementations of the subject disclosure.

As generally represented in FIG. 4, for cellular data, the scheduler user equipment 402(1) is also the receiver node; any other user equipment (e.g., the node 402(3) is not involved in a scheduled data transmission). This is represented in FIG. 4 via the dashed arrow 3*a* providing the transmission scheduling data DCI_T to the transmitter user equipment 402(2), followed by the data transmission (arrow 4) to the scheduler user equipment 402(1) based on the scheduling data.

In one alternative, if the scheduler user equipment has IAB (Integrated Access and Backhaul) or mobile relay functionality, then the communication between the transmitter user equipment 402(2) and the scheduler user equipment 402(1) can become an access link (e.g., as used by conventional cellular user equipments) and the data can be relayed over a backhaul link to another IAB node or donor node (e.g., a node with wired cellular core network connectivity). In another alternative, the link between the scheduler user equipment and the transmitter user equipment can utilize one or more Sidelink control formats and data transmission formats.

In general, the resource pool that any scheduler user equipment can schedule (including control and data resources) is orthogonal to the resource pool of any other scheduler user equipment within a given cell (corresponding to a network based station). However, a base-station with a good interference coordination scheme can configure multiple scheduler user equipments with overlapped resource pools. For example, a network base station can schedule two scheduler user equipments such that the control information transmitted to their supported transmitters and receivers can be shared in a non-interfering way, e.g., share a frequency range with different time slots. In this situation, the control channel monitoring resource for each transmitter user equipment or the receiver user equipment is the union set of all the control resources for the full set of the scheduler user equipments in the cell. With that, transmitter user equipment(s) and/or the receiver user equipment(s) effectively can hear the resource allocation for all the scheduler user equipments. The effective broadcast area becomes the whole cell.

The various flow diagrams exemplified herein represent operations that can be used to facilitate technology comprising scheduling user equipment and transmitter/receiver user equipment. As is understood, the operations are only examples to illustrate certain actions that can be taken, and can be in different orderings from those exemplified. Moreover, other operations, more operations, or fewer operations can be performed. Still further, at least some of the operations can be performed generally in parallel with one another; as but one non-limiting example, a scheduler user equipment can also be a transmitter user equipment and a receiver user equipment, including while waiting for a scheduling request.

Figure 5:
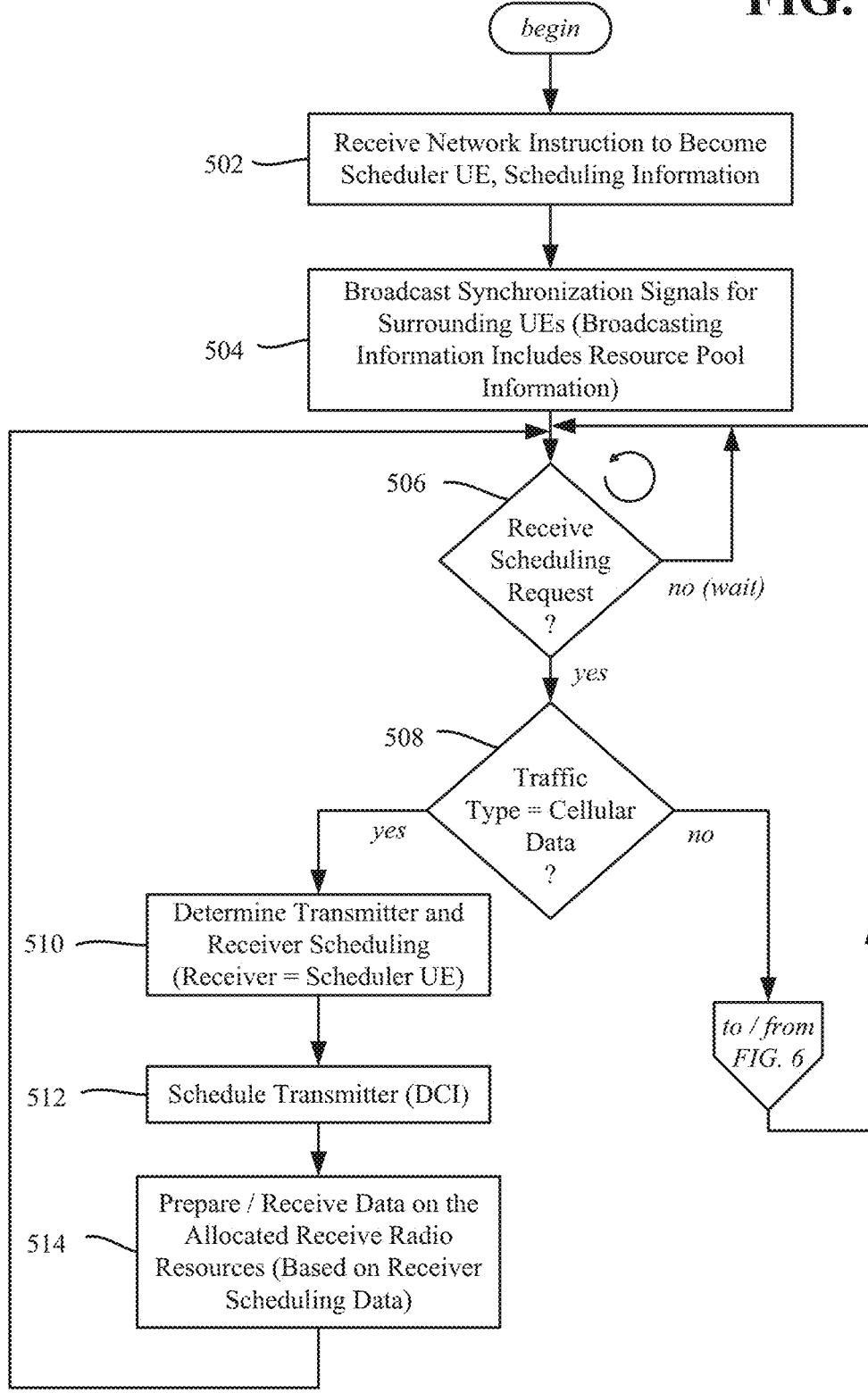
FIGS. 5-7 comprise a flow diagram of example operations of a scheduler user equipment, in accordance with various aspects and implementations of the subject disclosure.
Figure 6:
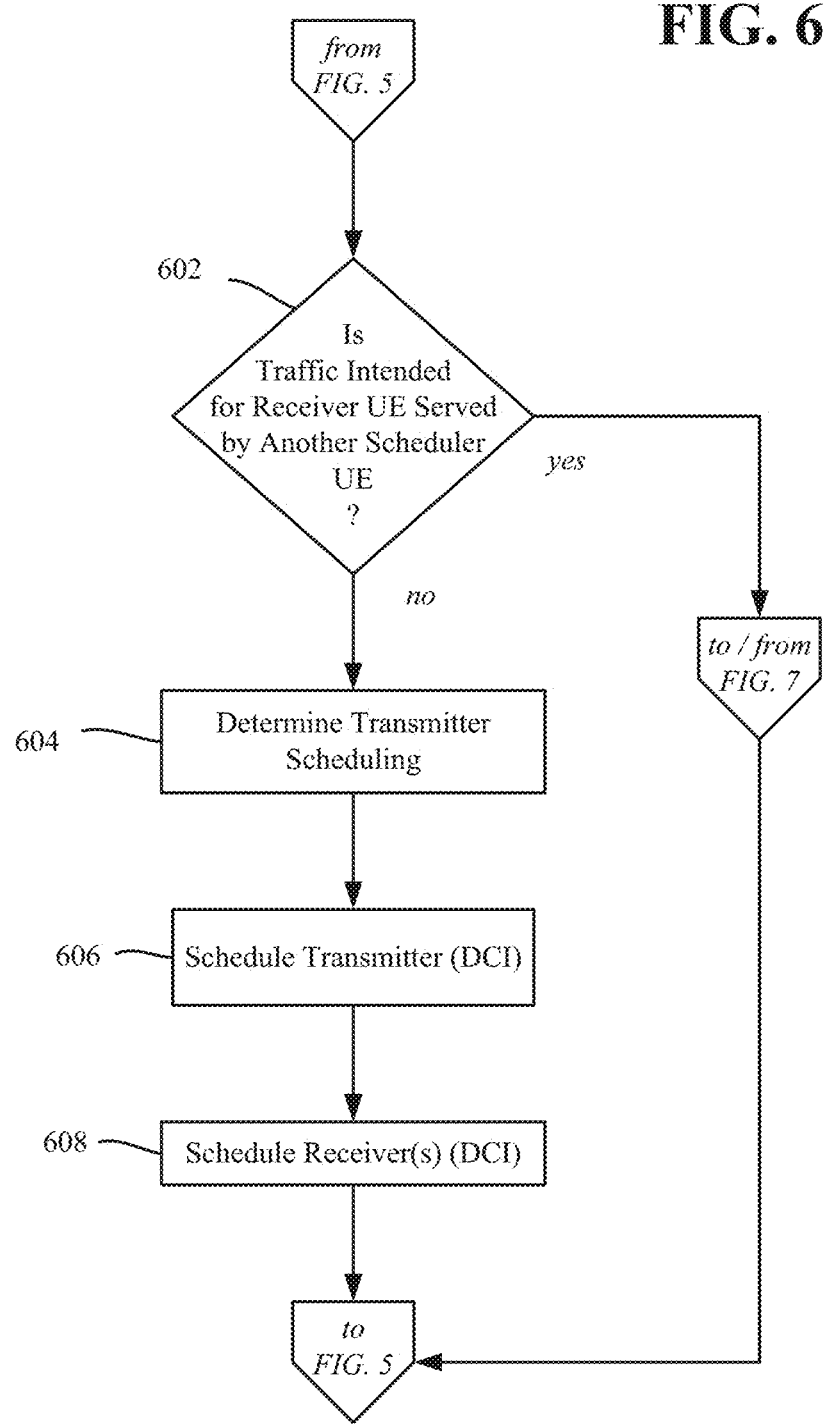
Figure 7:
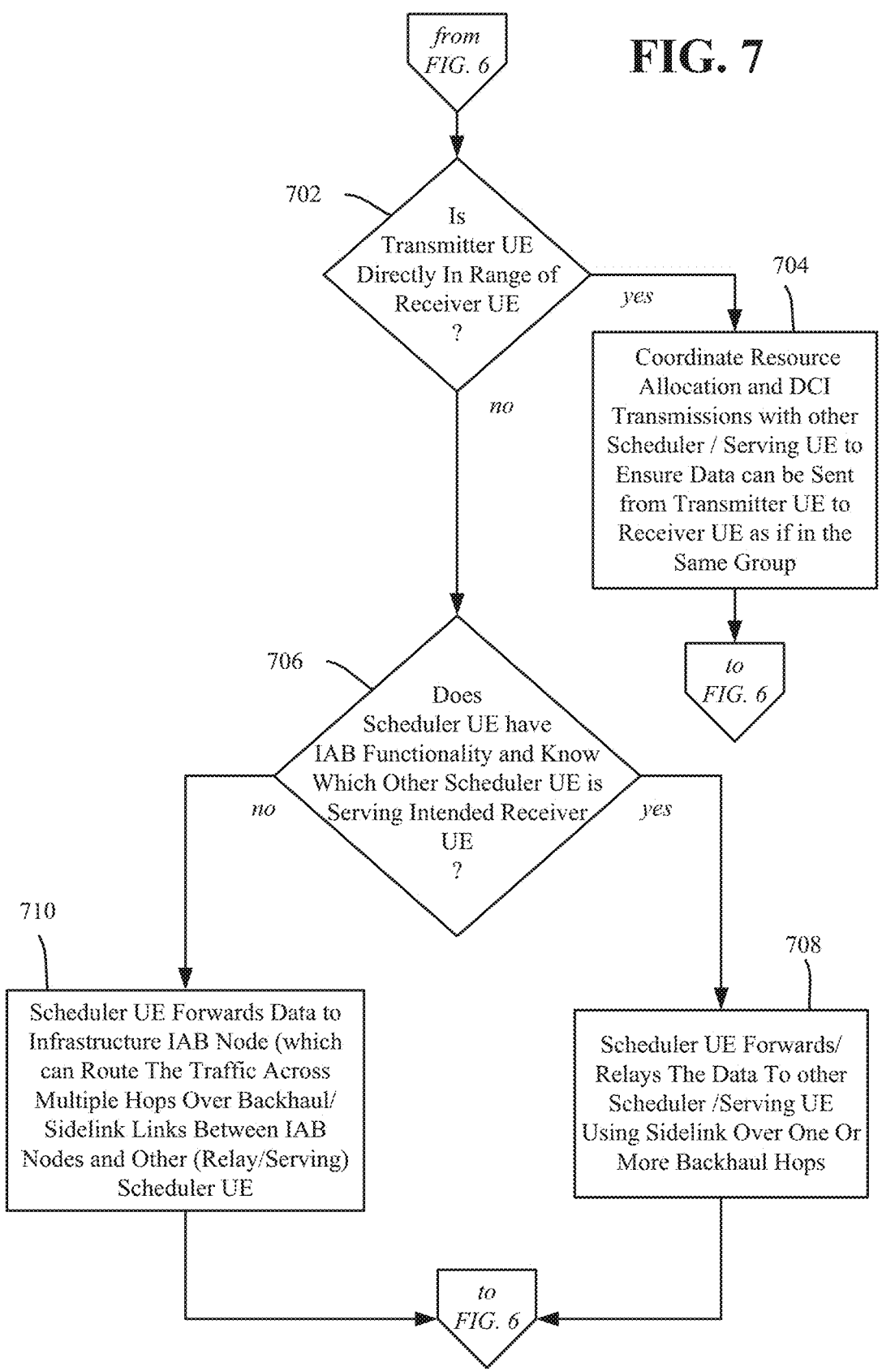

FIGS. 5-7 summarize example operations of a scheduler user equipment, beginning at operation 502 which represents receiving a network instruction to become a scheduler user interface, along with scheduling information that the scheduler user equipment can use to allocate radio resources. Note that a scheduler user equipment can be elected as a local manager, and thus operate as a scheduler user equipment without an explicit instruction from the network, although the scheduler user equipment does need to know what resources it can allocate to the user equipments in the scheduler user equipment's group.

Operation 504 represents broadcasting synchronization signals for surrounding/neighboring user equipments; the broadcasting information includes resource pool information. Other nodes synchronize with the scheduler user equipment and receive the broadcast information. Operation 506 represents waiting for a scheduling request; note that the scheduler user equipment can be performing other tasks while waiting.

When a node wants to transmit data as a transmitter user equipment, the node sends a scheduling request, which causes operation 506 to branch to operation 508. As described above, the scheduling request includes traffic type information that specifies V2X broadcast or multicast traffic, V2X unicast traffic (which also indicates the receiver node), or cellular traffic.

Operation 508 represents evaluating whether the traffic type information specifies cellular traffic. If so, the receiver is the scheduling user equipment (and thus need not transmit DCI to another receiver). Operation 510 represents determining the transmitter (and the receiver as itself) scheduling, and operation 512 schedules (transmits) the transmitter scheduling data via DCI to the requesting transmitter user equipment. Operation 514 represents preparing for and receiving the data via the allocated resources.

If at operation 508 the traffic type information does not specify cellular traffic, the scheduling process branches to operation 602 of FIG. 6, which evaluates whether the traffic is intended for a receiver user equipment served by another scheduler user equipment; (note that this applies to unicast traffic). If not, operation 604 determines the transmitter scheduling, operation 606 schedules the transmitter user equipment via DCI, and operation 608 schedules the receiver user equipment (for unicast) or receiver user equipments (for broadcast or multicast) via DCI. At this time the scheduling user equipment is no longer involved in this scheduling request, and the scheduling process returns to operation 506 of FIG. 5 to await another scheduling request. Note that although not explicitly shown, it is possible for the scheduler node to also be a receiver node and/or a transmitter node.

Returning to operation 602, the traffic generated by the transmitter user equipment and indicated in the scheduling request to the scheduler user equipment can be intended for another V2X receiver user equipment that is being served by a different scheduler user equipment. If so, the operations exemplified in FIG. 7 can be performed.

More particularly, in one alternative, represented via operations 702 and 704, if the transmitter node is directly in range of the target receiver node (as evaluated at operation 702), the scheduler user equipment serving the transmitter user equipment node and the other scheduler user equipment serving the receiver user equipment node may coordinate the resource allocation and DCIs to ensure the data can be sent from the transmitter user equipment node to the receiver user equipment node as if they were in the same group (operation 704). Note that for this alternative, the scheduler user equipment needs to know or be able to determine which other scheduler user equipment is serving the intended receiver user equipment.

In another alternative, if the scheduler user equipment has IAB functionality, and the scheduler user equipment is aware of which other scheduler user equipment is serving the intended receiver user equipment (operation 706), the scheduler user equipment may forward/relay the data from the transmitter node to the other scheduler user equipment using Sidelink over one or more backhaul hops to the other scheduler user equipment that is serving the target receiver user equipment (operation 708).

Otherwise, as represented by operation 710, another alternative is for the scheduler user equipment to forward the data to an infrastructure IAB node, which can route the traffic across multiple hops (if needed) over backhaul/Sidelink links between IAB nodes and the other (relay/serving) scheduler user equipment that is serving the target receiver user equipment.

Figure 8:
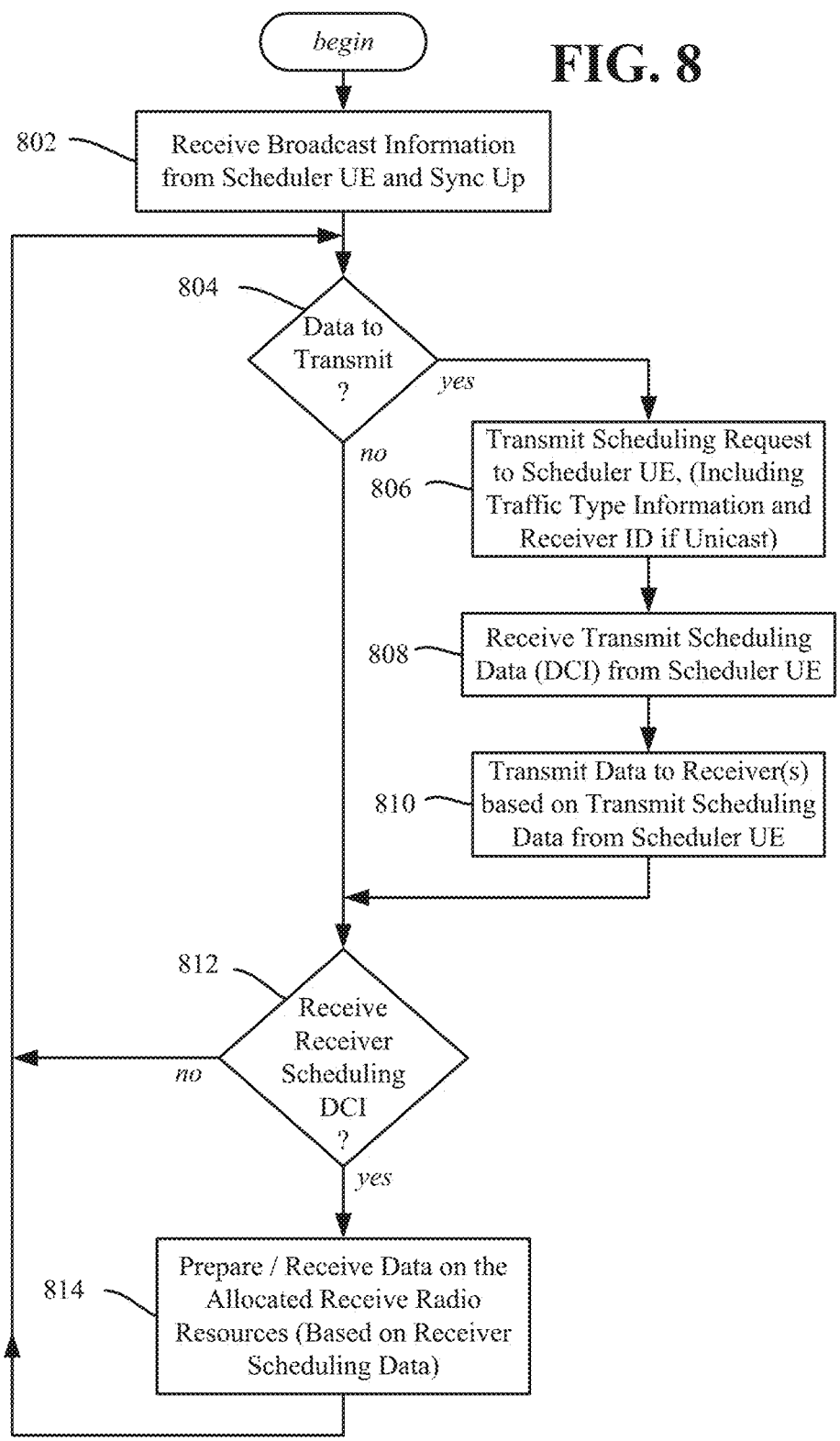
FIG. 8 illustrates a flow diagram of example transmitter/receiver user equipment operations for working with a scheduler user equipment, in accordance with various aspects and implementations of the subject disclosure.

FIG. 8 is a flow diagram representing example operations of a user equipment that can transmit and/or receive data. Operation 802 represents receiving the broadcast information from the scheduler user equipment and syncing up with the scheduler user equipment as described herein.

Operation 804 represents evaluating whether the user equipment has any data to transmit. If so, operation 806 is performed, which represents transmitting the scheduling request to the scheduler user equipment, including the traffic type information, and if unicast traffic type, the receiver identifier information. Operation 808 represents receiving the scheduling data from the scheduler user equipment via DCI. Operation 810 represents transmitting the data to the one or more receiver user equipment(s) based on the transmit scheduling data received at operation 808.

Whether or not the user equipment has any data to transmit, the user may be scheduled for receiving data, as evaluated at operation 812. If so, operation 814 represents preparing for/receiving the data on the allocated receiver radio resources (based on the receiver scheduling data).

Figure 9:
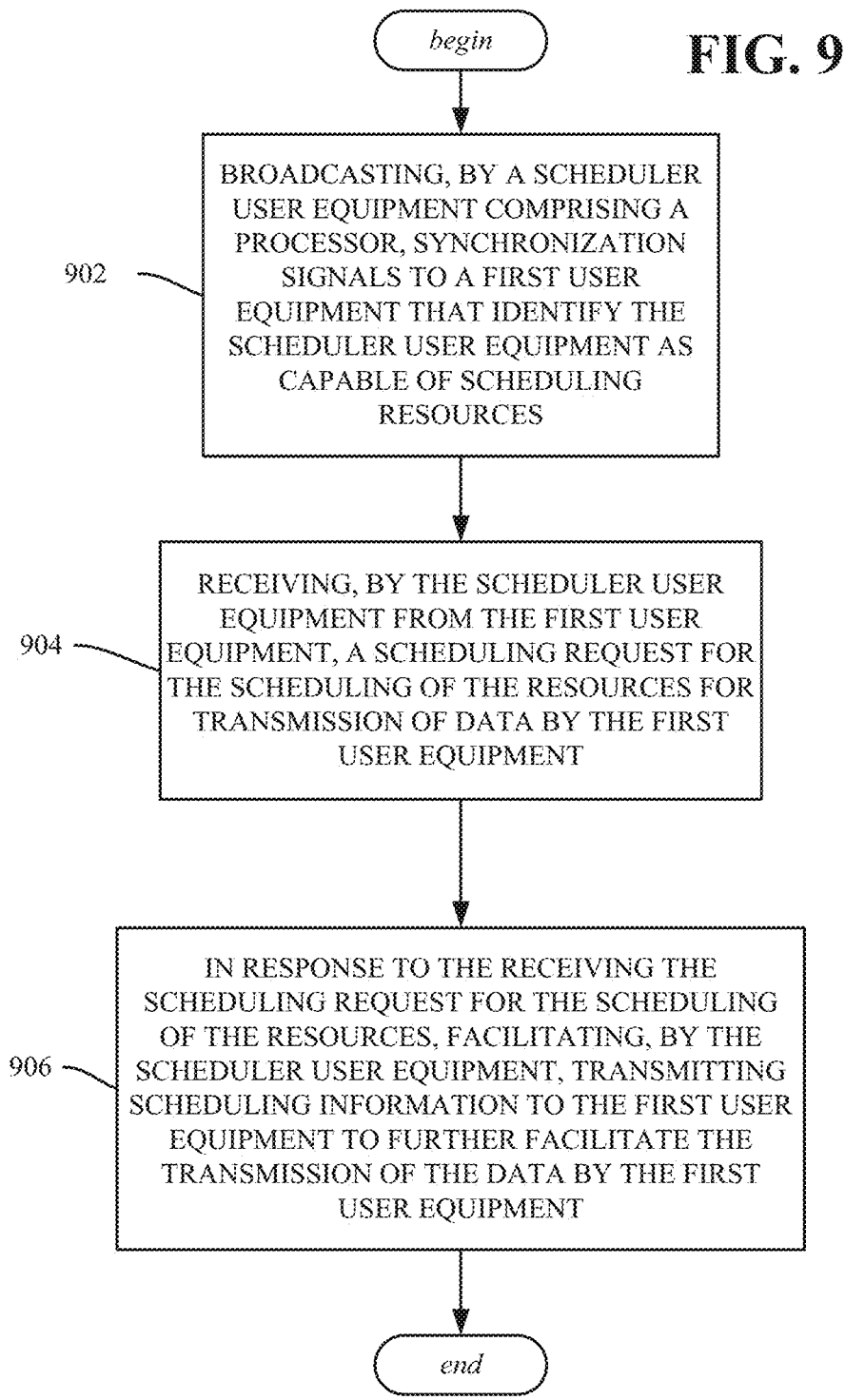
FIG. 9 illustrates an example flow diagram of scheduler user equipment operations, in accordance with various aspects and implementations of the subject disclosure.

FIG. 9 represents general, example operations of a scheduler user equipment 112, e.g., 112(1) (FIG. 1). Operation 902 represents broadcasting, by a scheduler user equipment comprising a processor, synchronization signals to a first user equipment that identify the scheduler user equipment as capable of scheduling resources. Operation 904 represents receiving, by the scheduler user equipment from the first user equipment, a scheduling request for the scheduling of the resources for transmission of data by the first user equipment. In response to the receiving the scheduling request for the scheduling of the resources, operation 906 represents facilitating, by the scheduler user equipment, transmitting scheduling information to the first user equipment to further facilitate the transmission of the data by the first user equipment.

Transmitting the scheduling information to the first user equipment can comprise transmitting the scheduling information as downlink control information to the first user equipment.

Aspects can comprise, facilitating, by the scheduler user equipment, transmitting the scheduling information to a second user equipment to facilitate the transmission of the data by the first user equipment directly to the second user equipment.

Receiving the scheduling request can comprise receiving traffic type information identifying the scheduling request as corresponding to unicast traffic; aspects can comprise, receiving, by the scheduler user equipment from the first user equipment, an identifier of the second user equipment. Receiving the scheduling request can comprise receiving traffic type information identifying the scheduling request as corresponding to broadcast traffic. Receiving the scheduling request can comprise receiving traffic type information identifying the scheduling request as corresponding to multicast traffic. Receiving the scheduling request can comprise receiving traffic type information identifying the scheduling request as corresponding to cellular traffic.

Aspects can comprise operating the scheduler user equipment as an access link with respect to the first node, comprising receiving, by the scheduler user equipment, cellular data from the first node, and relaying, by the scheduler user equipment, the cellular data to a network device.

Aspects can comprise, communicating, by the scheduler user equipment, with the first user equipment using one or more Sidelink control formats and one or more Sidelink data transmission formats to receive cellular data from the first user equipment.

The scheduler user equipment can comprise a first scheduler user equipment communicatively coupled to a network device associated with a cell. Aspects can comprise receiving, by the first scheduler user equipment from the network device, first resource pool information with which the first scheduler user equipment is configured for transmission of the scheduling information to the first user equipment, wherein the first resource pool information overlaps, without causing communication interference in the cell, with second resource pool information of a second scheduler user equipment communicatively coupled to the network device associated with the cell.

The scheduler user equipment can comprise a first scheduler user equipment communicatively coupled to a network device. Aspects can comprise, receiving, from the first user equipment, an identifier of a second user equipment identifying the second user equipment as an intended recipient of the transmission of the data by the first user equipment, determining, by the first scheduler user equipment, that the second user equipment is served by a second scheduler user equipment, and forwarding, by the first scheduler user equipment, a transmission received by the first scheduler user equipment from the first user equipment to the second scheduler user equipment for communication to the second user equipment.

Figure 10:
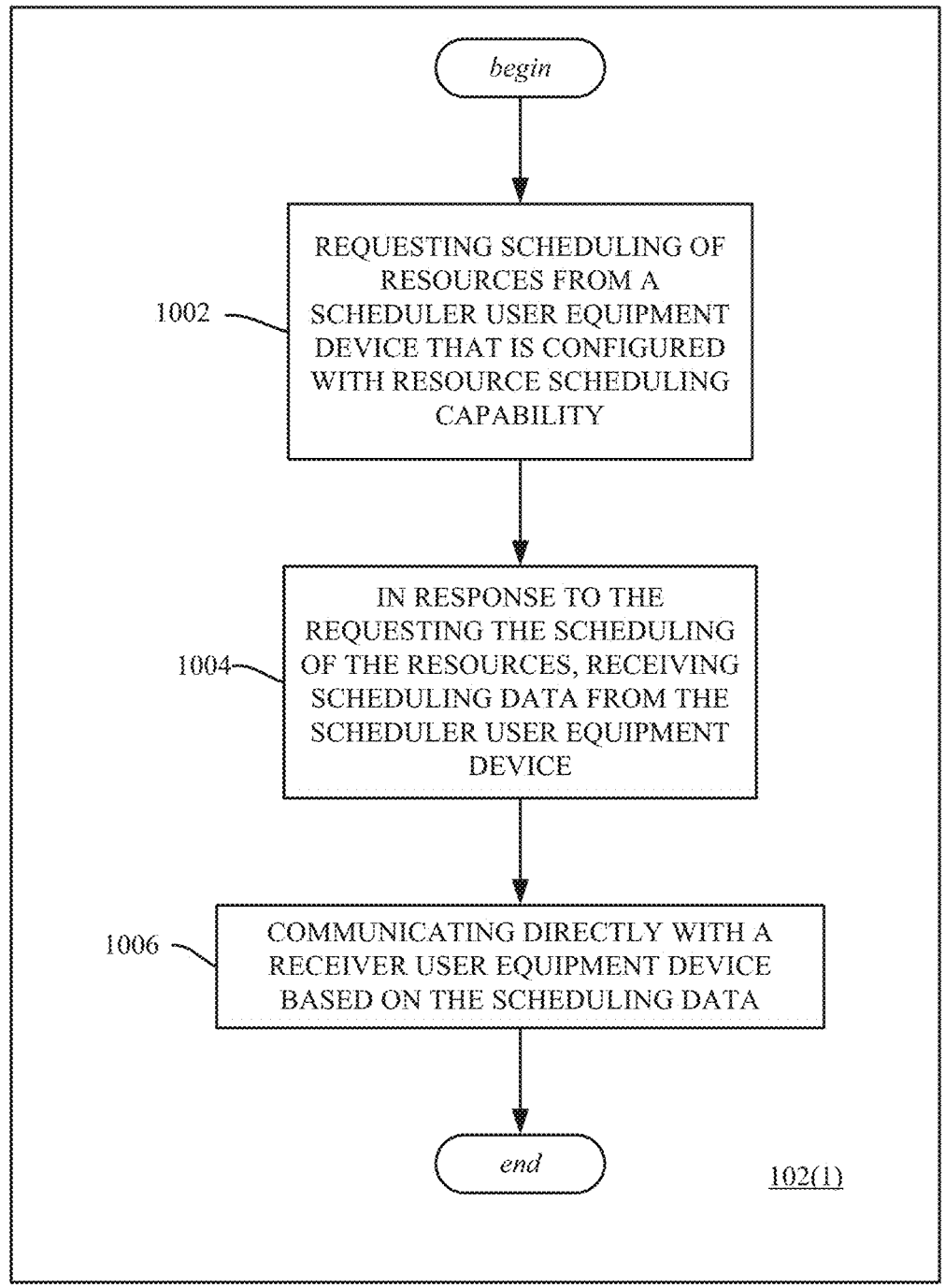
FIG. 10 illustrates an example flow diagram of transmitter user equipment operations, in accordance with various aspects and implementations of the subject disclosure.

FIG. 10 represents general, example operations of a transmitting radio user equipment device 112 (e.g., 112(2) of FIG. 2), generally comprising a processor a memory that stores executable instructions that, when executed by the processor, facilitate performance of operations. Example operations can comprise requesting scheduling of resources from a scheduler user equipment device that is configured with resource scheduling capability (operation 1002), and in response to the requesting the scheduling of the resources, receiving scheduling data from the scheduler user equipment device (operation 1004). Operation 1006 represents communicating directly with a receiver user equipment device based on the scheduling data.

Requesting the scheduling of the resources can comprise requesting the scheduling data for a broadcast transmission, and communicating directly with the receiver user equipment device based on the scheduling data can comprise broadcasting a transmission to the receiver user equipment device.

Requesting the scheduling of the resources can comprise requesting the scheduling data for a multicast transmission, and communicating directly with the receiver user equipment device based on the scheduling data can comprise multicasting a transmission to the receiver user equipment device.

Requesting the scheduling of the resources can comprise requesting the scheduling data for a unicast transmission to the receiver user equipment device and identifying the receiver user equipment device to the scheduler user equipment device, and communicating directly with the receiver user equipment device based on the scheduling data can comprise unicasting a transmission to the receiver user equipment device.

Requesting the scheduling of the resources can comprise requesting the scheduling data for transmission of cellular data to the scheduler user equipment device.

Figure 11:
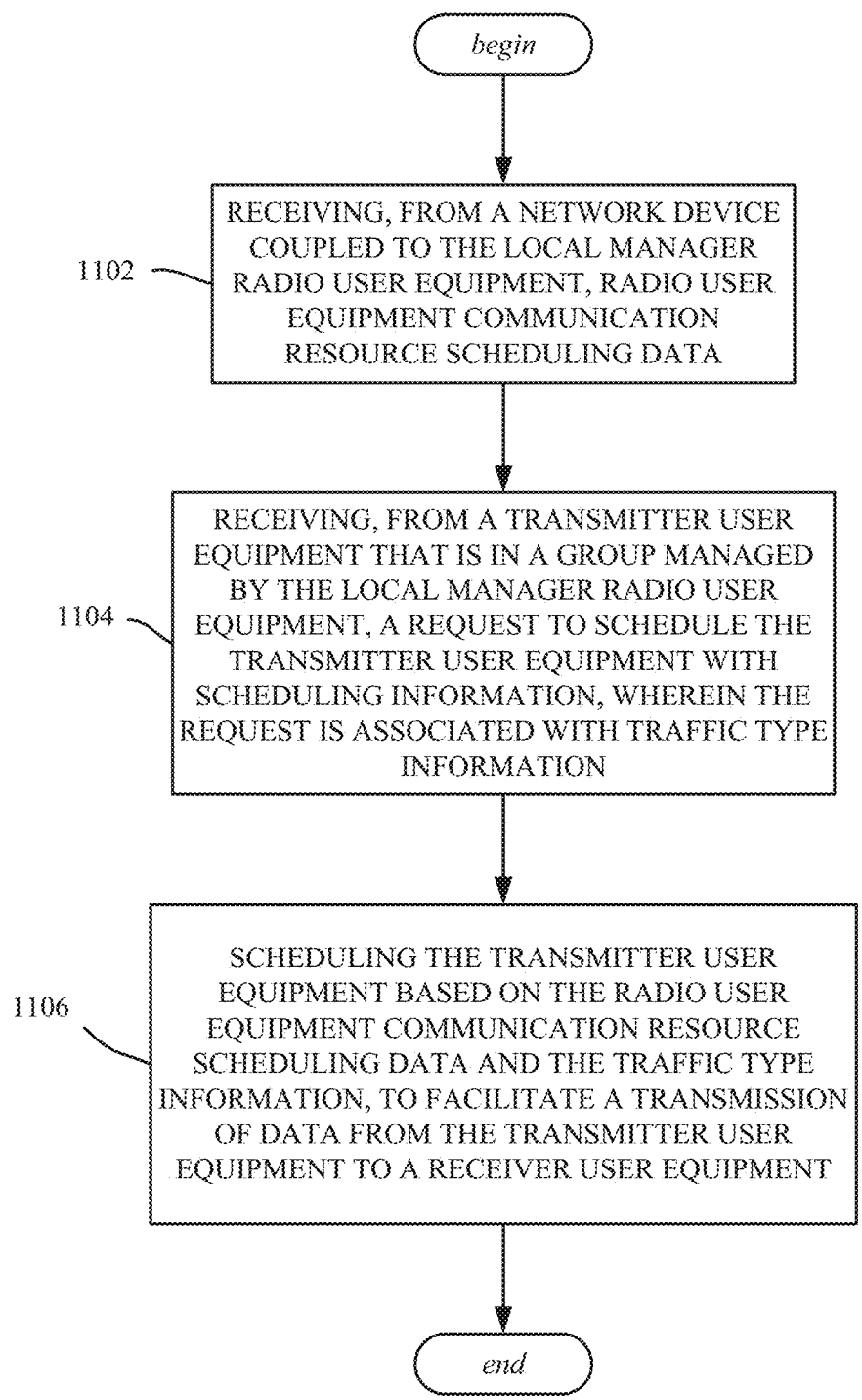
FIG. 11 illustrates an example flow diagram of scheduler user equipment operations, e.g., embodied as instructions executable by a processor, in accordance with various aspects and implementations of the subject disclosure.

FIG. 11 represents general, example operations of a radio user equipment device, e.g., operating as a scheduler radio user equipment device. Example operations can comprise receiving, from a network device coupled to the local manager radio user equipment, radio user equipment communication resource scheduling data (operation 1102) and receiving, from a transmitter user equipment that is in a group managed by the local manager radio user equipment, a request to schedule the transmitter user equipment with scheduling information, wherein the request is associated with traffic type information (operation 1104). Operation 1106 represents scheduling the transmitter user equipment based on the radio user equipment communication resource scheduling data and the traffic type information, to facilitate a transmission of data from the transmitter user equipment to a receiver user equipment.

The traffic type information can correspond to cellular data information, and wherein the operations further comprise, receiving the transmission comprising cellular data from the transmitter user equipment at the local manager radio user equipment, and relaying the cellular data to the network device.

The traffic type information can correspond to unicast information, and wherein the operations further comprise, receiving an identifier of the receiver user equipment, and scheduling the receiver user equipment based on the radio user equipment communication resource scheduling data and the traffic type information, to facilitate a direct transmission of the data from the transmitter user equipment to the receiver user equipment.

The receiver user equipment can be in a different group managed by a different local manager radio user equipment, and the operations can further comprise coordinating with the different local manager radio user equipment to facilitate the transmission of the data from the transmitter user equipment to the receiver user equipment.

As can be seen, this three-party communication allows a dedicated node (a scheduler user equipment) to coordinate the resource utilization in a certain local area. The scheduler user equipment operating as a dedicated resource coordinator can coordinate the resource utilization to avoid frequent resource usage collisions, thereby improve the efficiency of communications. Moreover, because there is no need for a comprehensive initial access procedure the transmitter user equipment and the receive user equipment do not need a formal association with the scheduler user equipment. When the transmitter user equipment and/or the receive user equipment move away from the scheduler user equipment, there is no need for a handover procedure.

This technology described herein facilitates hardware sharing between the regular cellular network and the vehicle-to-everything (V2X) or device-to-device (D2D) network. The same node (scheduler user equipment) can serve as a relay node for the cellular network as well as vehicle-to-everything local manager. This technology described herein facilitates the use of mobile relays with existing infrastructure-based IAB nodes under a common architecture and resource allocation framework. This technology described herein facilitates spectrum sharing between regular cellular networks and V2X services; the same spectrum band may be reused by V2X service or regular cellular traffic.

Figure 12:
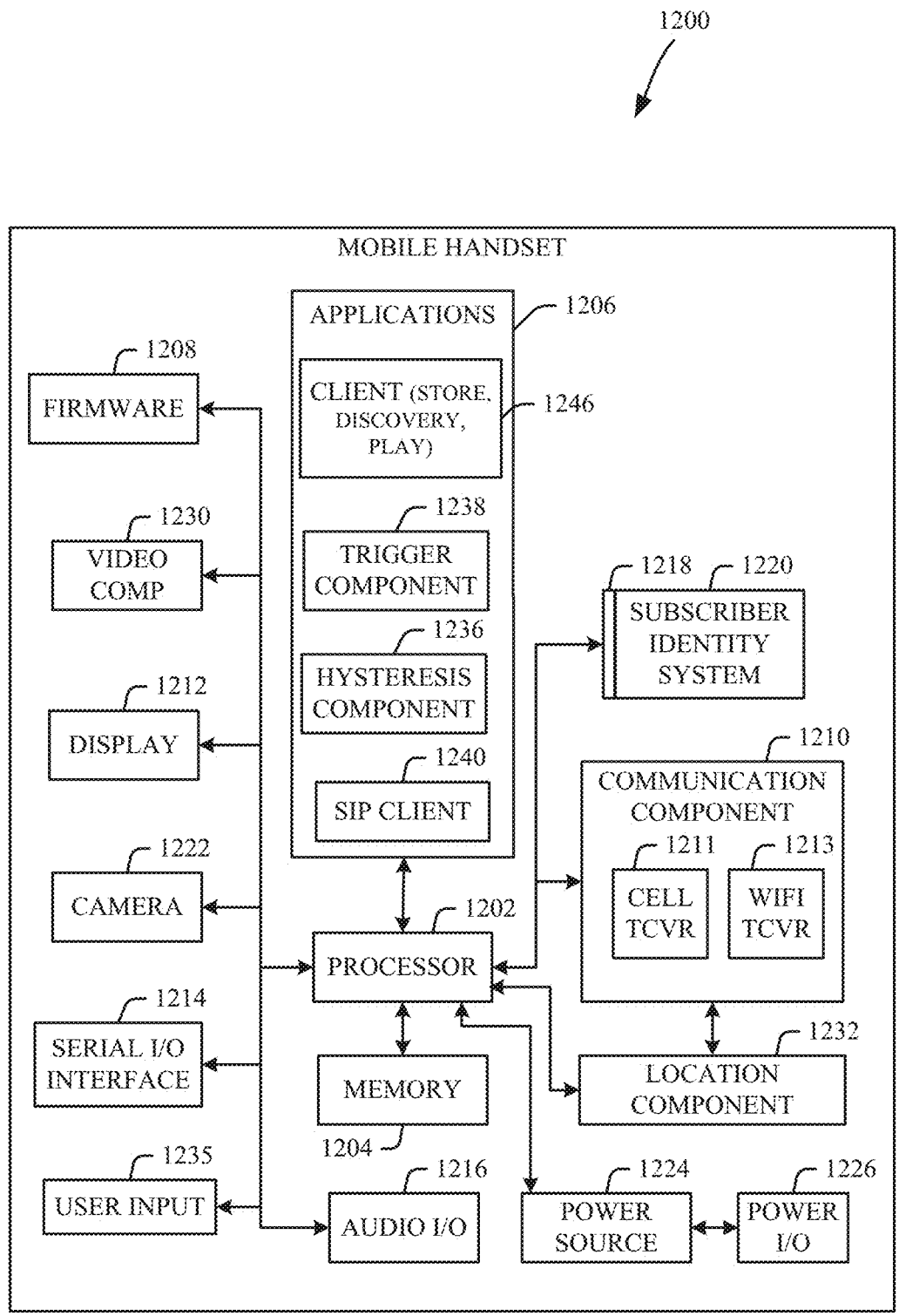
FIG. 12 illustrates an example block diagram of an example mobile handset operable to engage in a system architecture that facilitates wireless communications according to one or more embodiments described herein.

Referring now to FIG. 12, illustrated is an example block diagram of an example mobile handset 1200 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hard-wire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or a decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
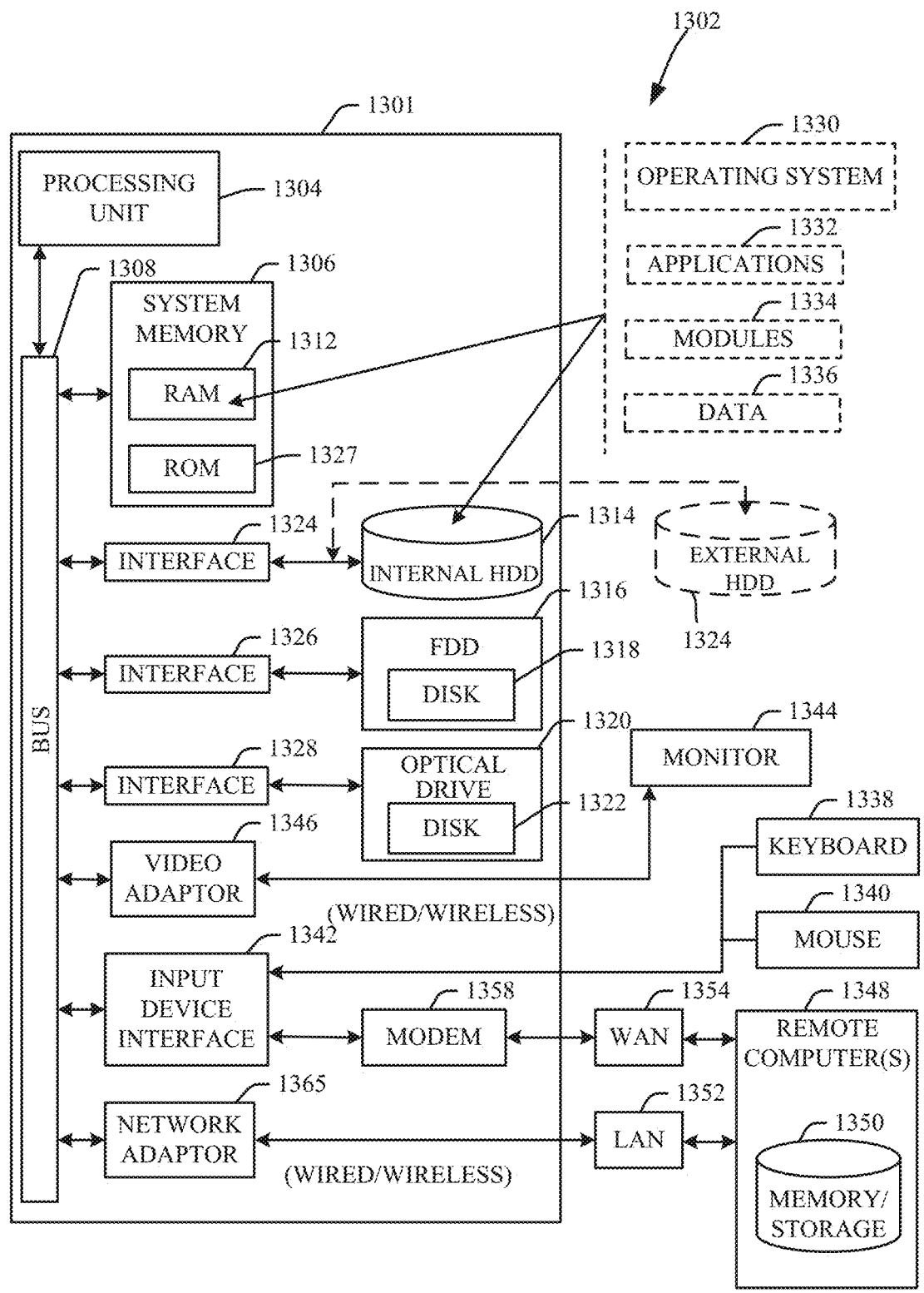
FIG. 13 illustrates an example block diagram of an example computer operable to engage in a system architecture that facilitates wireless communications according to one or more embodiments described herein.

Referring now to FIG. 13, illustrated is an example block diagram of an example computer 1300 operable to engage in a system architecture that facilitates wireless communications according to one or more embodiments described herein. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 13 is but one example of a computing device.

In order to provide a context for the various aspects of the disclosed subject matter, FIG. 13 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 13 illustrates a block diagram of a computing system 1300 operable to execute the disclosed systems and methods in accordance with an embodiment. Computer 1312, which can be, for example, part of the hardware of system 1320, includes a processing unit 1314, a system memory 1316, and a system bus 1318. System bus 1318 couples system components including, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1394), and Small Computer Systems Interface (SCSI).

System memory 1316 can include volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 can also include removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 13 describes software that acts as an intermediary between users and computer resources described in suitable operating environment 1300. Such software includes an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be noted that the disclosed subject matter can be implemented with various operating systems or combinations of operating systems.

A user can enter commands or information into computer 1312 through input device(s) 1336. As an example, a mobile device and/or portable device can include a user interface embodied in a touch sensitive display panel allowing a user to interact with computer 1312. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1314 through system bus 1318 by way of interface port(s) 1338. Interface port(s) 1338 include, for example, a serial port, a parallel port, a game port, a universal serial bus (USB), an infrared port, a Bluetooth port, an IP port, or a logical port associated with a wireless service, etc. Output device(s) 1340 and a move use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340 like monitors, speakers, and printers, among other output devices 1340, which use special adapters. Output adapters 1342 include, by way of illustration and not limitation, video and sound cards that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, cloud storage, cloud service, a workstation, a microprocessor based appliance, a peer device, or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected by way of communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
broadcasting, by a scheduler user equipment comprising a processor, synchronization signals to a first user equipment that identify the scheduler user equipment as capable of scheduling resources, wherein the scheduler user equipment comprises a first scheduler user equipment communicatively coupled to a network device associated with a cell;
receiving, by the first scheduler user equipment from the network device, first resource pool information with which the first scheduler user equipment is configured for transmission of the scheduling information to the first user equipment, wherein the first resource pool information overlaps, without causing communication interference in the cell, with second resource pool information of a second scheduler user equipment communicatively coupled to the network device associated with the cell;
receiving, by the scheduler user equipment from the first user equipment, a scheduling request for the scheduling of the resources for transmission of data by the first user equipment; and
in response to the receiving the scheduling request for the scheduling of the resources, facilitating, by the scheduler user equipment, transmitting scheduling information to the first user equipment and transmitting scheduling information to a second user equipment, to further facilitate the transmission of the data by the first user equipment directly to the second user equipment.

2. The method of claim 1, wherein the transmitting the scheduling information to the first user equipment comprises transmitting the scheduling information as downlink control information to the first user equipment.

3. The method of claim 1, wherein the receiving the scheduling request further comprises receiving traffic type information identifying the scheduling request as corresponding to unicast traffic, and further comprising, receiving, by the scheduler user equipment from the first user equipment, an identifier of the second user equipment.

4. The method of claim 1, wherein the receiving the scheduling request further comprises receiving traffic type information identifying the scheduling request as corresponding to broadcast traffic, and wherein in response to the receiving the scheduling request for the scheduling of the resources, the facilitating, by the scheduler user equipment further comprises, facilitating, by the scheduler user equipment, transmitting the scheduling information to a third user equipment to facilitate the transmission of the data as a broadcast transmission by the first user equipment to the second user equipment and third user equipment.

5. The method of claim 1, wherein the receiving the scheduling request further comprises receiving traffic type information identifying the scheduling request as corresponding to multicast traffic, and wherein in response to the receiving the scheduling request for the scheduling of the resources, the facilitating, by the scheduler user equipment further comprises, facilitating, by the scheduler user equipment, transmitting the scheduling information to a third user equipment to facilitate the transmission of the data as a multicast transmission by the first user equipment to the second user equipment and third user equipment.

6. The method of claim 1, wherein the receiving the scheduling request further comprises receiving traffic type information identifying the scheduling request as corresponding to cellular traffic.

7. The method of claim 6, further comprising operating the scheduler user equipment as an access link with respect to the first user equipment, comprising receiving, by the scheduler user equipment, cellular data from the first user equipment, and relaying, by the scheduler user equipment, the cellular data to a network device.

8. The method of claim 6, further comprising, communicating, by the scheduler user equipment, with the first user equipment using one or more Sidelink control formats and one or more Sidelink data transmission formats to receive cellular data from the first user equipment.

9. The method of claim 1, wherein the scheduler user equipment comprises the first scheduler user equipment communicatively coupled to the network device, and further comprising, receiving, from the first user equipment, an identifier of a third user equipment identifying the third user equipment as an intended recipient of the transmission of the data by the first user equipment, determining, by the first scheduler user equipment, that the third user equipment is served by the second scheduler user equipment, and forwarding, by the first scheduler user equipment, a transmission received by the first scheduler user equipment from the first user equipment to the second scheduler user equipment for communication to the third user equipment.

10. The method of claim 1, wherein the scheduler user equipment comprises the first scheduler user equipment communicatively coupled to the network device, and further comprising, receiving, from the first user equipment, an identifier of the second user equipment identifying the second user equipment as an intended recipient of the transmission of the data by the first user equipment, determining, by the first scheduler user equipment, that the second user equipment is served by the second scheduler user equipment, and coordinating, by the first scheduler user equipment and the second scheduler user equipment, to facilitate direct communication from the first user equipment to the second user equipment.

11. A transmitter user equipment device, comprising:
a processor; and
a memory that stores executable instructions that, when executed by the processor, facilitate performance of operations, the operations comprising:
requesting scheduling of resources from a scheduler user equipment device that is configured with resource scheduling capability;
in response to the requesting the scheduling of the resources, receiving scheduling data from the scheduler user equipment device; and
communicating directly with a receiver user equipment device based on the scheduling data, wherein the communicating comprises, in response to determining that the requesting the scheduling of the resources comprises requesting the scheduling data for a broadcast transmission, broadcasting a transmission to the receiver user equipment device.

12. The transmitter user equipment device of claim 11, wherein the communicating comprises, in response to determining that the requesting the scheduling of the resources comprises requesting the scheduling data for a multicast transmission, multicasting a transmission to the receiver user equipment device.

13. The transmitter user equipment device of claim 11, wherein the communicating comprises, in response to determining that the requesting the scheduling of the resources comprises requesting the scheduling data for a unicast transmission to the receiver user equipment device, identifying the receiver user equipment device to the scheduler user equipment device, and unicasting a transmission to the receiver user equipment device.

14. The transmitter user equipment device of claim 11, wherein the communicating comprises, in response to determining that the requesting the scheduling of the resources comprises requesting the scheduling data for transmission of cellular data to the scheduler user equipment device, operating the transmitter user equipment device as an access link with respect to the receiver user equipment device.

15. A non-transitory machine-readable medium, comprising executable instructions that, when executed by a processor of a local manager radio user equipment, facilitate performance of operations, the operations comprising:
   receiving, from a network device coupled to the local manager radio user equipment, radio user equipment communication resource scheduling data;
   receiving, from a transmitter user equipment that is in a group managed by the local manager radio user equipment, a request to schedule the transmitter user equipment with scheduling information, wherein the request is associated with traffic type information; and
   scheduling the transmitter user equipment based on the radio user equipment communication resource scheduling data and the traffic type information, to facilitate a transmission of data from the transmitter user equipment to a receiver user equipment, wherein the scheduling comprises, in response to determining that the traffic type information corresponds to unicast information, receiving an identifier of the receiver user equipment, and scheduling the receiver user equipment based on the radio user equipment communication resource scheduling data and the traffic type information, to facilitate the transmission to be a direct transmission of the data from the transmitter user equipment to the receiver user equipment.

16. The non-transitory machine-readable medium of claim 15, wherein in response to determining that the traffic type information corresponds to cellular data information, receiving the transmission comprising cellular data from the transmitter user equipment at the local manager radio user equipment, and relaying the cellular data to the network device.

17. The non-transitory machine-readable medium of claim 15, wherein in response to determining that the receiver user equipment is in a different group managed by a different local manager radio user equipment, coordinating with the different local manager radio user equipment to facilitate the transmission of the data from the transmitter user equipment to the receiver user equipment.

18. The non-transitory machine-readable medium of claim 15, wherein the scheduling the transmitter user equipment comprises transmitting scheduling information to the transmitter user equipment.

19. The non-transitory machine-readable medium of claim 18, wherein the transmitting the scheduling information to the transmitter user equipment comprises transmitting the scheduling information as downlink control information to the transmitter user equipment.

20. The transmitter user equipment device of claim 11, wherein the receiving the scheduling data comprises receiving the scheduling data as downlink control information.

* * * * *